(12) United States Patent
Salim et al.

(10) Patent No.: US 6,439,415 B1
(45) Date of Patent: Aug. 27, 2002

(54) CLOSURE FOR AN EQUIPMENT SUB

(75) Inventors: Abu Salim, Ft. Worth; Marney Dunman Perry, Jr.; John A. Krogue, both of Mineral Wells, all of TX (US)

(73) Assignee: Perry Equipment Corporation, Mineral Wells, TX (US)

( * ) Notice: Subject to any disclaimer, the term of this patent is extended or adjusted under 35 U.S.C. 154(b) by 63 days.

(21) Appl. No.: 09/586,040

(22) Filed: Jun. 2, 2000

(51) Int. Cl.[7] ............................................. B65D 14/28
(52) U.S. Cl. ....................................... 220/323; 220/817
(58) Field of Search ............................... 220/323, 263, 220/264, 817, 845, 348, 810, 811, 813, 315, 316, 314, 378; 105/8; 49/8; 16/235, 237, 374

(56) References Cited

U.S. PATENT DOCUMENTS

| | | | | |
|---|---|---|---|---|
| 2,237,528 A | * | 4/1941 | Marasso | 220/47 |
| 2,592,627 A | * | 4/1952 | Ward | 220/57 |
| 3,667,649 A | * | 6/1972 | Thillet | 220/55 Y |
| 4,307,818 A | * | 12/1981 | Singh et al. | 220/316 |
| 4,467,986 A | * | 8/1984 | Makhijani | 220/246 |
| 4,519,519 A | * | 5/1985 | Meuschke et al. | 220/211 |
| 5,148,938 A | * | 9/1992 | Morgan, Jr. | 220/316 |
| 6,289,555 B1 | * | 9/2001 | Nguyen et al. | 16/235 |
| 6,293,051 B1 | * | 9/2001 | Matye | 49/395 |

FOREIGN PATENT DOCUMENTS

GB 2172956 10/1986 ............ F18J/13/02

* cited by examiner

*Primary Examiner*—Lee Young
*Assistant Examiner*—Lien Ngo
(74) *Attorney, Agent, or Firm*—Bracewell & Patterson, LLP

(57) ABSTRACT

A closure is shown for an equipment sub having a generally cylindrical aperture leading to a bore and a bore stop. The closure is a circular body having a O-ring seal on a peripheral flange. A common actuating means moves spaced arcuate segments located on the circular body outwardly into contact with the bore stop provided in the bore of the equipment sub.

16 Claims, 5 Drawing Sheets

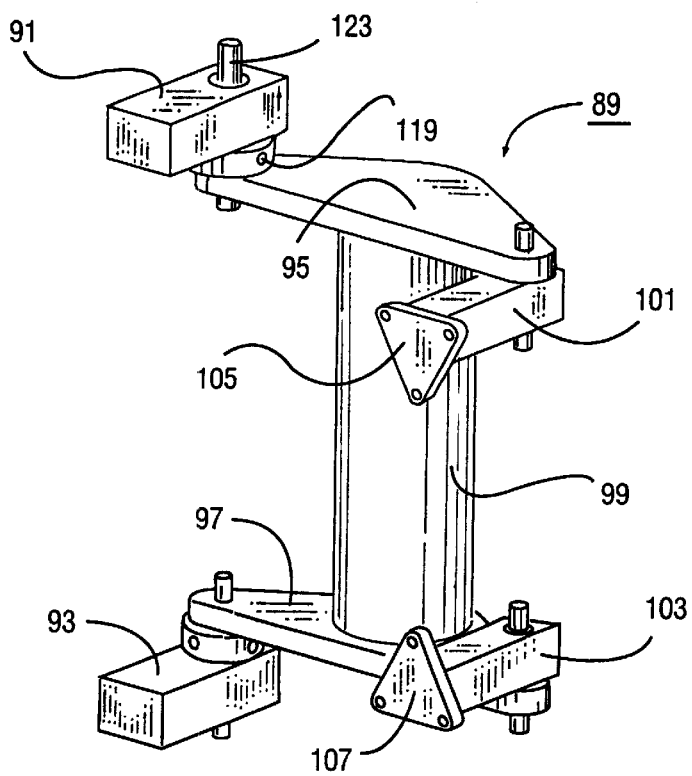
FIG. 6
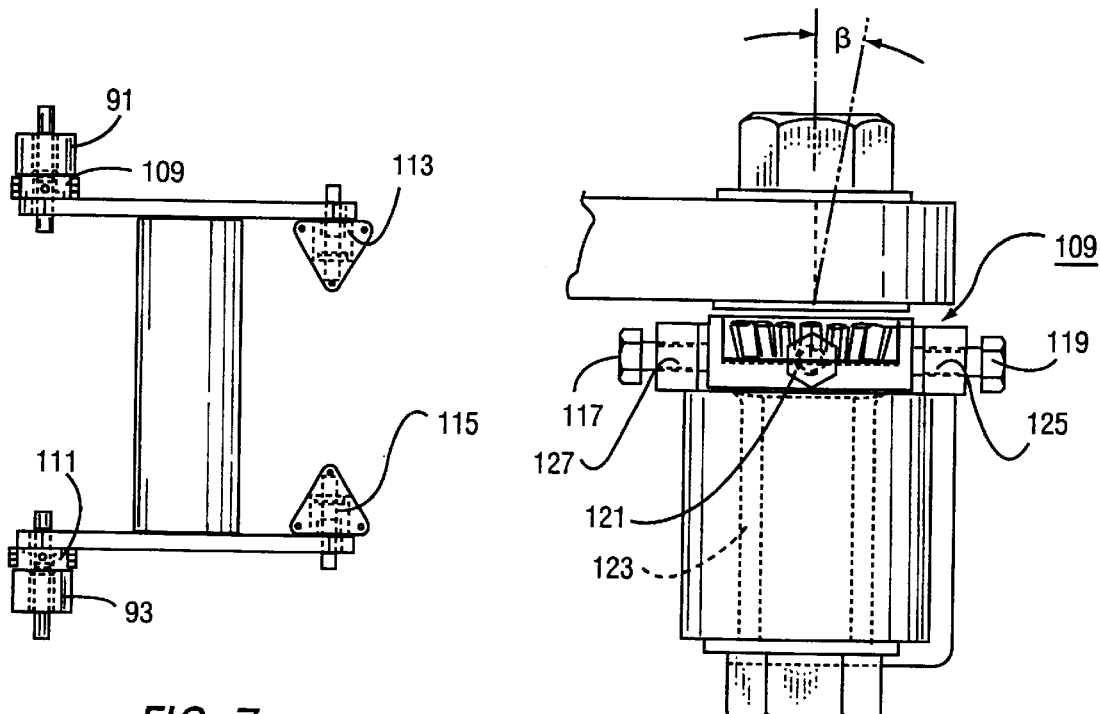
FIG. 7
FIG. 8

CLOSURE FOR AN EQUIPMENT SUB

BACKGROUND ART

1. Field of the Invention

This invention relates to closure devices and, specifically, to closures which can be quickly opened and closed and which can provide access to the interior of a pressure or a vacuum vessel, a pipeline or conduit, or other types of equipment in which there is likely to be a pressure differential across a closed opening.

2. Description of the Prior Art

A variety of pressure and vacuum vessels are known in the prior art which require a closure device for access. For example, such equipment includes gas filters/filter separators, gas scrubbers, scraper and pig traps, meter provers, manways to pressure vessels, liquid phase separators/coalescers, and launcher and receiver barrels for pipe line use, and the like. Equipment of the above type often features an ASME and API quick opening closure for access to the vessel or equipment interior.

Perry Equipment Corporation of Mineral Wells, Tex., has, for many years, offered equipment of the above types including quick opening closures therefor.

U.K. Patent No. GB2172956, assigned to an affiliate of the present assignee, shows a closure for an equipment sub which includes a cylindrical aperture which is closed by a circular member having an O-ring seal. A locking arrangement on the circular member secures it within the aperture. The locking arrangement includes a plurality of arcuate segments which are linked together to form a substantially complete ring and are mounted on an annular flange of the circular member. The segments are pivoted outwardly to cause them to engage a step provided in the cylindrical aperture by a control arrangement.

While the above device provided a safe and workable closure for a pressure vessel, it was complicated in design and featured a sealing surface geometry which was less than optimum.

Thus, despite advances made in closures of the above described type, there continues to be a need for further improvement.

BRIEF SUMMARY OF THE INVENTION

The present invention has as one object to provide a closure for an equipment sub which can be quickly opened and closed to provide access to the interior of a pressure or vacuum vessel or other type of equipment where a pressure differential exists across the closed opening.

The invention also has as its object to provide such a closure which is simple in design and economical to manufacture and which utilizes the minimum number of moving parts.

Another object of the invention is to provide a closure with an improved sealing surface which is less critical in tolerance than the prior designs and which will accommodate a standard O-ring seal instead of requiring custom seal arrangements.

Another object of the invention is to provide a closure having a pressure warning device integral therewith which assures the release of any remaining pressure within the vessel prior to opening the closure.

Another object of the invention is to provide a closure with an improved hinge mechanism which allows precise alignment of the closure with respect to the opening provided in the associated equipment sub.

These objects are accomplished in a closure for an equipment sub having a generally cylindrical aperture leading to a bore and a bore stop. The closure includes a cylindrical body for engaging and disengaging the cylindrical aperture. The cylindrical body carries a peripheral seal on an outer peripheral flange thereof for sealing within the aperture when in the engaged position. A plurality of arcuate segments are mounted on the cylindrical body in a ring-like, spaced-apart pattern. A common actuating means connects the plurality of arcuate segments for simultaneously moving the arcuate segments radially outward to engage the stop in the bore of the sub and thereby prevent axial movement in at least one direction between the cylindrical body and the bore of the sub.

The stop in the bore of the equipment sub preferably comprises a shoulder formed as a part of a wedge shaped annular recess in a wall of the equipment sub. The shoulder is engaged by the arcuate segments when the cylindrical body is in the engaged position. The annular recess leads to a seal region of the equipment sub. The seal region comprises a sloping surface relative to a line drawn parallel to a central axis of the cylindrical aperture, the seal region being engaged by the peripheral seal of the cylindrical body when the body is in the engaged position within the aperture.

The common actuating means can comprise a plurality of cross bars which extend generally radially of the circular body, each cross bar being coupled at an outer extent thereof to a respective one of the segments and being coupled at an opposite inner extent thereof to a central hub assembly which can be rotated to cause radial movement of the cross bars to move the segments outwardly or inwardly.

Each arcuate segment has a pair of spaced guide rods attached thereto. Each guide rod is received within an opening provided in an associated guide block which in anchored to the circular body. The guide rods are, in turn, attached to a cross bar which is used to connect the guide rods to a selected cross bar. Each cross bar is pivotally attached to the central hub assembly. The central hub assembly has a lever arm for rotating the hub assembly, wherein movement of the hub assembly causes radial movement of the cross bars to move the segments outwardly or inwardly.

Additional objects, features and advantages will be apparent in the written description which follows.

BRIEF DESCRIPTION OF THE DRAWINGS

The novel features believed characteristic of the invention are set forth in the appended claims. The invention itself however, as well as a preferred mode of use, will best be understood by reference to the following detailed description of an illustrative embodiment when read in conjunction with the accompanying drawings, wherein:

FIG. 6 is an isolated view of the hinge mechanism used with the closure of the invention;

FIG. 7 is a side view of the hinge mechanism of the FIG. 6 showing the bearings arrangement thereof;

FIG. 8 is an isolated view of the level adjustment of the hinge mechanism of FIG. 6.

DETAILED DESCRIPTION OF THE PREFERRED EMBODIMENT

Figure 1:
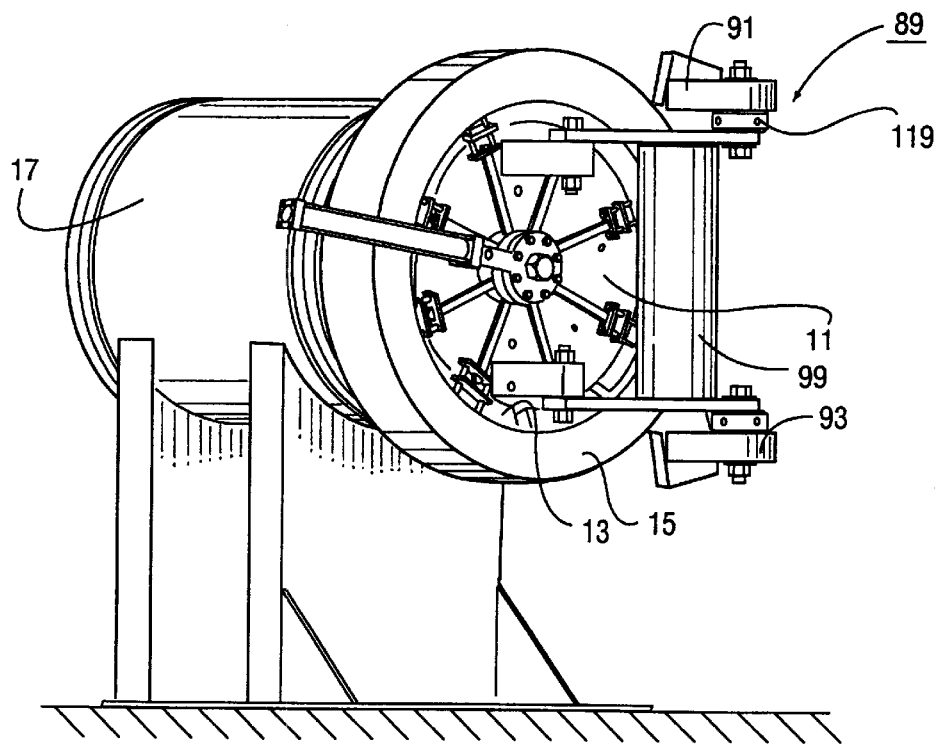
FIG. 1 is a perspective view of a closure of the invention in place on an equipment sub for a pressure vessel.
Figure 2:
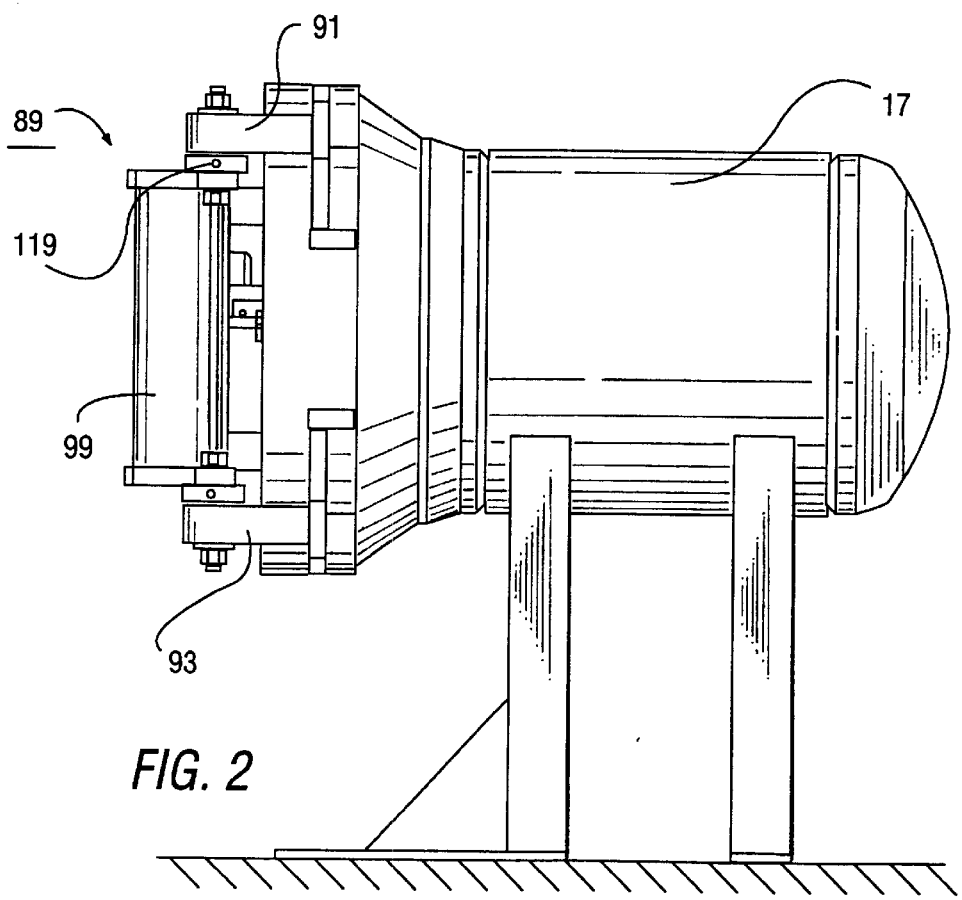
FIG. 2 is a side view of the pressure vessel of FIG. 1 showing the hinge assembly for the closure of the invention.

FIG. 1 shows the closure 11 of the invention in the engaged position within the generally cylindrical aperture 13 of an equipment sub 15 which is mounted on a pressure vessel 17. By "equipment sub" is meant that the closure and sub of the invention can be fitted to a variety of vessels and other type equipment, such as the equipment described under the above description of the prior art, such as pipelines, or the like. The equipment sub 15, shown in isolated fashion in FIG. 3 has a rear flange 17 which can be affixed to a suitable opening on the associated equipment, as by welding.

Figure 9:
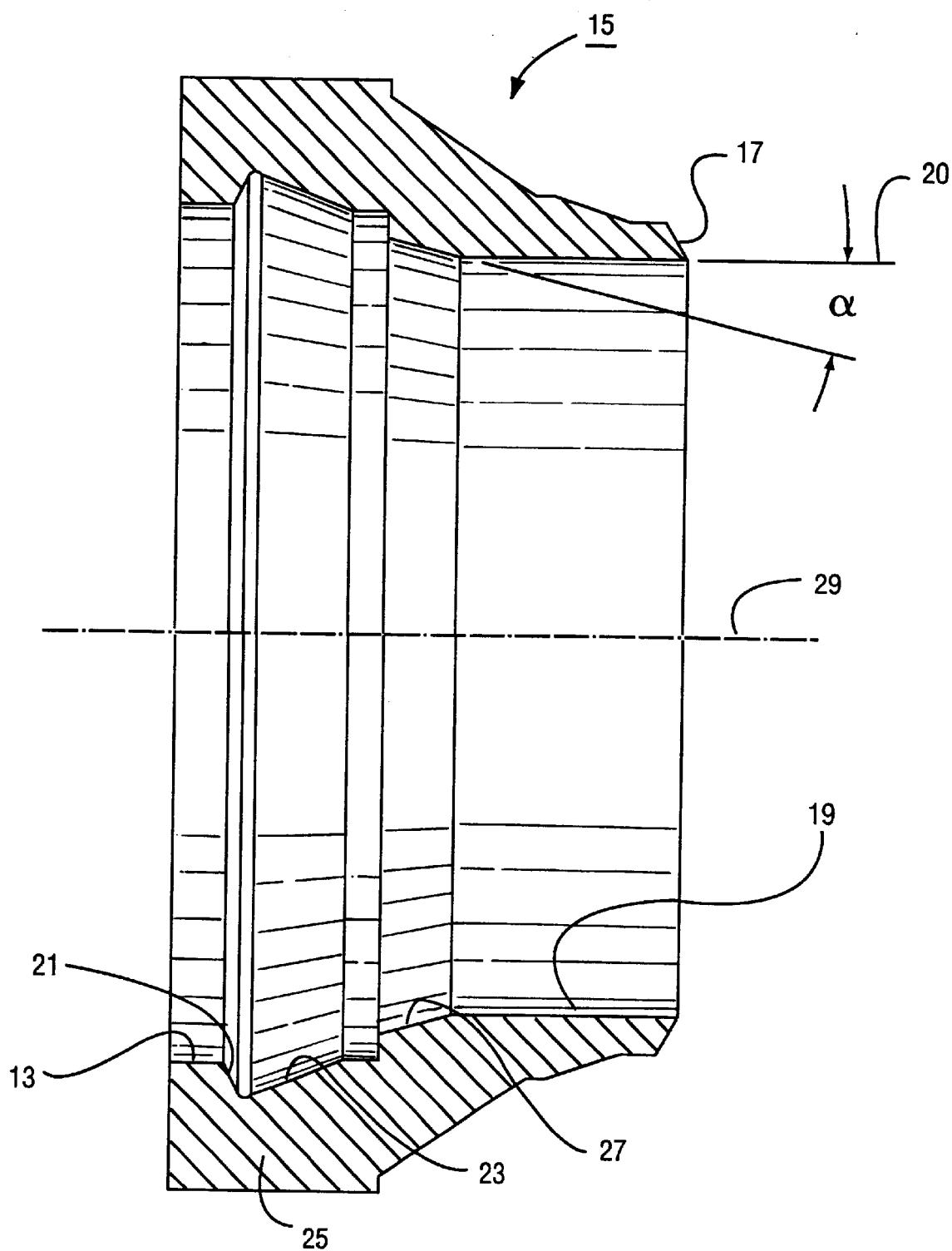
FIG. 9 is a side, cross-sectional view of the equipment sub which receives the closure of the invention showing the internal profile thereof.

As best seen in FIG. 9, the equipment sub 15 in addition to the generally cylindrical aperture 13 has a bore 19 and a bore stop 21. The stop 21 in the bore 19 of the equipment sub 15 comprises a shoulder-formed as a part of a wedge shaped annular recess 23 in a wall 25 of the equipment sub 15. The shoulder 21, as will be more fully explained, is engaged by the closure when the closure is in the engaged position. The annular recess 23 leads to a primary seal region 27 of the equipment sub. The primary seal region comprises a sloping surface relative to a line 20 drawn parallel to the central axis 29 of the cylindrical aperture 13. As viewed in FIG. 9, the sloping surface 27 forms an angle α of approximately 10 to 20°, most preferably about 15°, with respect to the axis 20.

Figure 3:
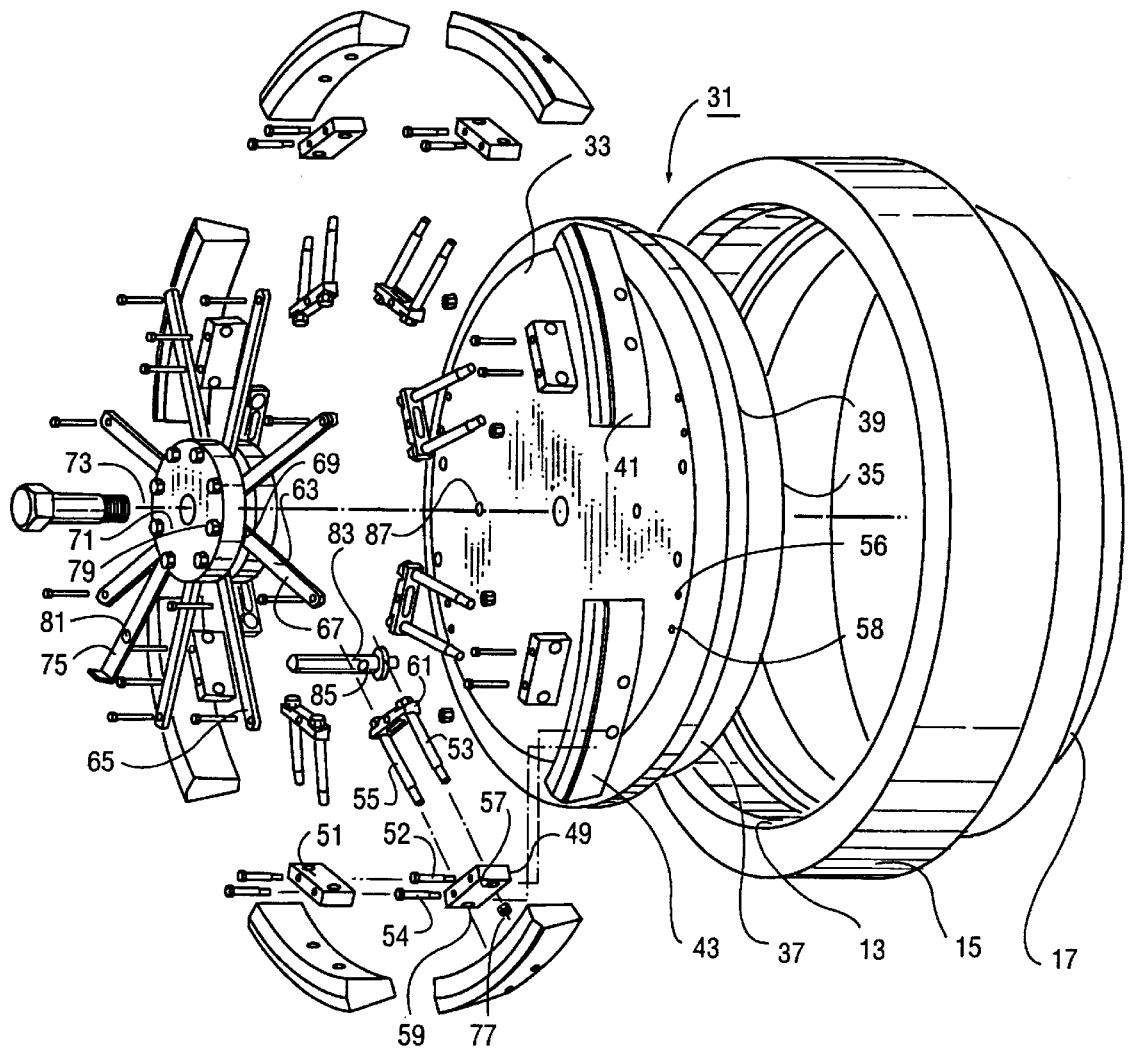
FIG. 3 is an isolated, exploded view of the closure of the invention and showing the cylindrical aperture of the equipment sub which receives the closure.
Figure 4:
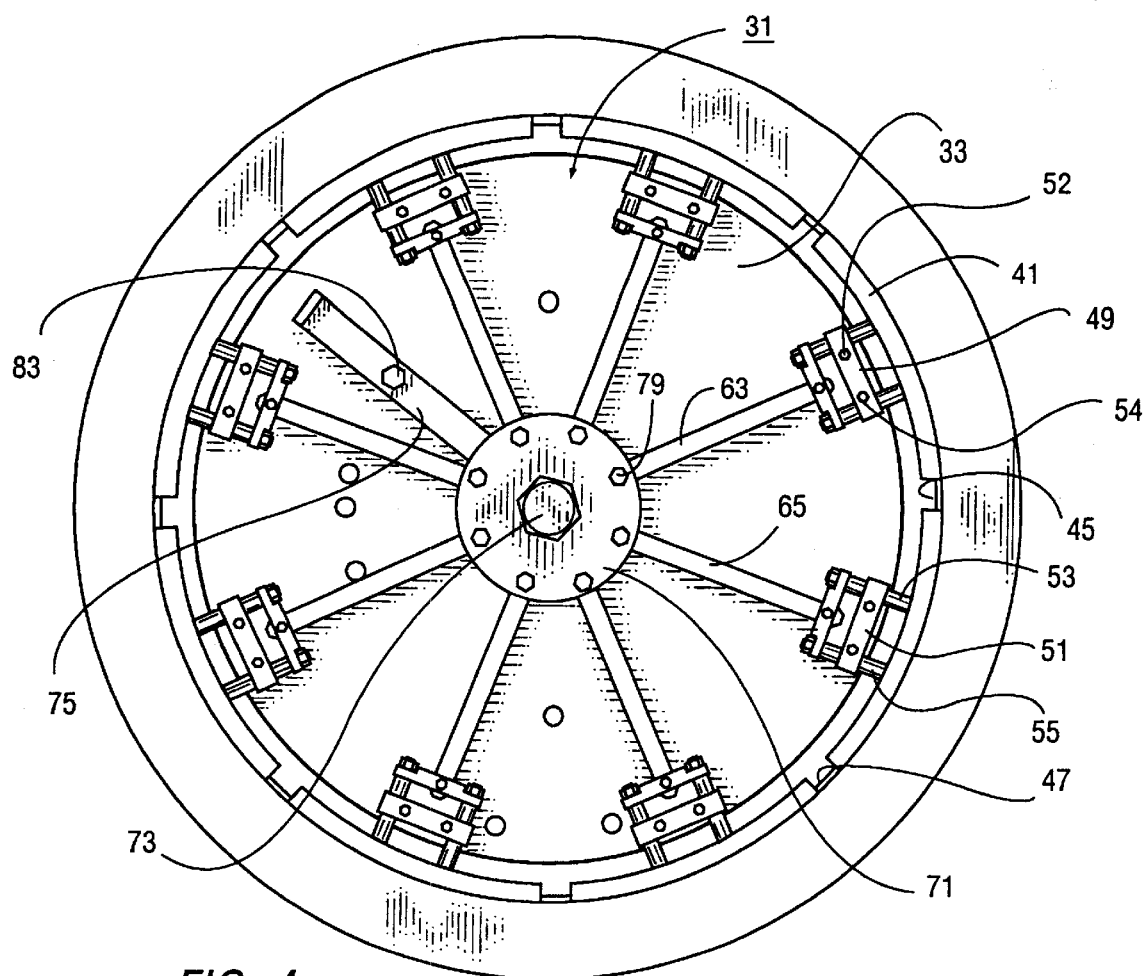
FIG. 4 is top view of the closure shown in the engaged position within the cylindrical aperture of the equipment sub.

As shown in FIG. 3, the closure includes a circular body 31 for engaging and disengaging the cylindrical aperture 13 of the equipment sub 15. The circular body includes an outer planar surface 33, an inner planar surface 35 and an outer peripheral flange 37. The outer peripheral flange 37 carries a peripheral seal. The outer peripheral seal can comprise a standard O-ring 39 mounted in a circumferential groove provided on the flange for sealing withing the aperture 13 of the equipment sub when the closure is in an engaged position (FIG. 4). When in the engaged position, the O-ring 39 engages the 15° sloping surface 27 (FIG. 9) of the equipment sub 15.

Figure 5:
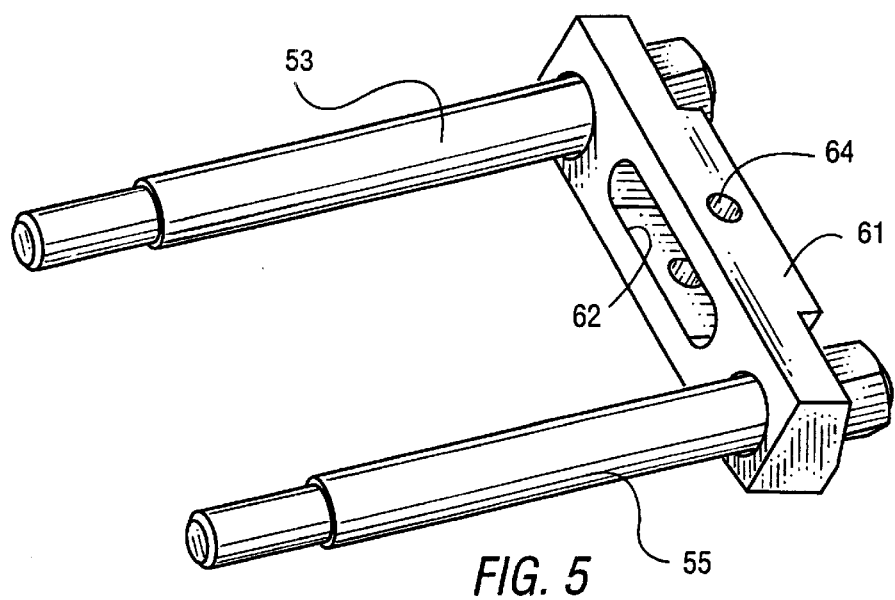
FIG. 5 is an isolated view of the guide rods and cross bar connector which are used as a part of the common actuating means of the invention.

As best seen in FIGS. 3 and 5, the circular body has mounted thereon a plurality of arcuate segments. For simplicity, only two of the segments, e.g., 41, 43 will be discussed, it being understood that the remaining segments are identical. As shown in FIG. 4, the segments 41, 43 are mounted on the circular body 31 in a ring-like, spaced-apart pattern which includes the gaps 45, 47. Rather than utilizing a connecting spring or additional hardware to form a continuous ring as in the prior art, the arcuate segments are mounted by means of guide blocks 49, 51 which are anchored to the outer planar surface 33 of the circular body by means of bolts 52, 54. The bolts 52, 54 pass through vertical bores provided in the guide blocks 49, 51 and are threaddedly engaged within threaded openings (56, 58 in FIG. 3) provided in the outer planar surface 33.

A pair of spaced guide rods 53, 55 (See FIG. 5) are received within lateral openings 57, 59 (FIG. 3) provided within the respective associated guide blocks 49, 51. Each guide rod is, in turn, attached to a cross bar connector 61 which is used to connect the guide rods to a selected cross bar, such as cross bars 63, 65.

As best seen in FIGS. 3 and 4, the previously described components make up a part of a common actuating means which connects the plurality of arcuate segments 41, 43 for simultaneously moving the arcuate segments radially outward to engage the stop (21 in FIG. 9) in the bore 19 of the equipment sub 15 and thereby prevent axial movement in at least one direction between the circular body and the bore of the sub. The cross bars 63, 65 extend generally radially of the circular body 31. Each cross bar, 63, 65 is coupled at an outer extent thereof to a respective cross bar connecter 61 (FIG. 5) by means of slot 62 and bolt opening 64. Each cross bar 63, 65 is coupled at an opposite, inner extent 69 thereof, to a central hub assembly 71. The inner extent of each cross bar 61, 63 is free to pivot about a respective vertical axis of the mounting bolts 79.

The central hub assembly 71 can be rotated about the vertical axis 73 (FIGS. 3 and 4) by means of lever 75 to cause radial movement of the cross bars, 63, 65 to move the segments 41, 43 outwardly or inwardly. When the operating lever 75 (as viewed in FIG. 1) is rotated through an angle of less than about 20°, the hub assembly and cross bars 63, 65 move in carousel fashion and the cross bars attempt to contract at an angle. As the guide rods 53, 55 move within the guide blocks 49, 51, the segments 41, 43 move toward the center of the circular body, bringing the closure to the open or disengaged position. Rotation of the handle back to the original angular location pushes the segments 41, 43 radially outward to the closed or fully engaged position in contact with the stop 21 of the equipment sub.

The lateral openings (57, 59 in FIG. 3) in the guide blocks are preferably provided with a hard plastic bushing 77 which provides a reduced friction slide surface for the guide rods 53, 55.

As shown in FIGS. 3 and 4, the lever arm 75 has a vertical bore 81 for receiving a pressure locking device. The pressure locking device 83 is a threaded bolt or rod having an O-ring seal with a washer stop thereon. In order to move the lever 75 in an arcuate direction, it is necessary to first unscrew the rod 83 from the threaded opening (87 in FIG. 3) provided in the circular body 31. As the rod is unscrewed, any remaining pressure within the vessel interior is allowed to be released and warns the user of the presence of pressure within the vessel. Once the rod 83 is unthreaded from the opening 87, the lever 75 is free to be rotated in an angular direction with respect to the central hub assembly 71.

FIGS. 6–8 show the hinge assembly 89 which is used to mount the closure 11 upon the equipment sub 15. The hinge assembly includes upper and lower mounting blocks 91, 93 which are welded or otherwise affixed to the exterior of the equipment sub. Upper and lower flanges 95, 97 and intermediate body 99 support the cross members 101, 103 which are attached by means of upper and lower plates 105, 107 to the outer planar surface 33 of the circular body 31.

As best viewed in FIGS. 6 and 7, the mounting blocks 91, 93 and cross members 101, 103 are pivotable about vertical axes by means of bearing assemblies 109, 111, and 113, 115. The bearing assemblies 113, 115 can be simple shafts located within suitable bushings. However, the bearing assemblies 109, 111 are preferably adjustable to provide precise alignment of the closure 11 within the cylindrical aperture 13 of the equipment sub.

Referring to FIG. 8, the bearing assembly 109 includes oppositely arranged bolts 117, 119. Bolt 121 (shown in FIG.

8) also has an opposite member (not shown). Each bolt is located within a threaded bore which allows an inner extent of each bolt to contact the vertical shaft 123 of the bearing assembly. In order to adjust the vertical shaft 123 about an axis designated as β in FIG. 8, the bolt 119 would be loosened from its mating threaded bore 15 while bolt 117 would be tightened within the threaded bore 127. This action allows the vertical shaft 123 to be moved through the angle β in extremely small increments, even less than one millimeter. In a similar fashion, the vertical shaft 23 can be adjusted in the opposite plane by means of bolt 121 and its opposite counterpart. The adjustment mechanism allows precise adjustment of the closure 11 within the aperture provided in the equipment sub 15.

An invention has been provided with several advantages. The closure of the invention is simple in design and economical to manufacture. The design features fewer moving parts than in the prior art designs and is more reliable in operation. The improved sealing surface provides a reliable seal while utilizing a standard O-ring seal configuration. A specialized seal configuration is not required and the sealing tolerances are reduced. The closure features a pressure warning device which must be disabled for the operating lever can be utilized to move the closure to the disengaged position. The hinge assembly which is used to mount the closure allows precise adjustment of the alignment of the closure within the cylindrical aperture of the equipment sub. Adjustments as small as 1 mm or less can be achieved simply with simple hand tools.

The closure can be mounted in either the vertical or the horizontal position. The closure opening and closing operations are performed by the use of a single lever arm. Only one operator is required to operate the closure. For opening and closing, the lever arm needs to be rotated less than a 45° angle. The hinge mechanism allows the closure body to be fully retrieved from the aperture in the equipment sub so that the body is allowed to rest by the side of the vessel to provide complete access to the aperture. The sealing surfaces of the device provide an excellent pressure seal using a simple O-ring elastomer gasket.

It should be apparent from the foregoing that an invention having significant advantages has been provided. While the invention is shown in only one of its forms, it is not thus limited, but is susceptible to various changes and modifications without departing from the spirit thereof.

We claim:

1. A closure for an equipment sub having a generally cylindrical aperture leading to a bore and a bore stop, the closure comprising:

a circular body for engaging and disengaging the cylindrical aperture, the circular body carrying a peripheral seal on an outer peripheral flange thereof for sealing within the aperture when in an engaged position;

a plurality of arcuate segments mounted on the cylindrical body in a ring-shaped, spaced-apart pattern;

a common actuating means connecting the plurality of arcuate segments for simultaneously moving the arcuate segments radially outward to engage the stop in the bore of the sub and thereby prevent axial movement in at least one direction between the circular body and the bore of the sub;

wherein the common actuating means comprises a plurality of cross bars extending generally radially of the circular body, each cross bar being coupled at an outer extent thereof to a respective one of the segments and being coupled at an opposite inner extent thereof to a central hub assembly which can be rotated to cause radial movement of the cross bars to move the segments outwardly or inwardly; and wherein each arcuate segment has a pair of spaced guide rods attached thereto, each guide rod being received within a lateral opening provided in an associated guide block which is anchored to the circular body, and wherein the guide rods are, in turn, attached to a cross bar connector which is used to connect the guide rods to a selected cross bar.

2. The closure of claim 1, wherein each cross bar is pivotally attached to the central hub assembly, the central hub assembly having a lever arm for rotating the hub assembly, wherein movement of the hub assembly causes radial movement of the cross bars to move the arcuate segments outwardly or inwardly.

3. The closure of claim 2, wherein each of the lateral openings provided in the guide blocks have mounted therein a hard plastic bushing which provides a reduced friction slide surface for the guide rods.

4. In combination, an equipment sub having a generally cylindrical aperture leading to a bore and a bore stop and an improved closure therefor, the combination comprising:

a circular body for engaging and disengaging the cylindrical aperture of the equipment sub, the circular body carrying a peripheral seal for sealing within the aperture when in an engaged position;

a plurality of arcuate segments mounted on the cylindrical body;

a common actuating means connecting the plurality of arcuate segments for simultaneously moving the arcuate segments radially outward to engage the stop in the bore of the sub and thereby prevent axial movement in at least one direction between the circular body and the bore of the sub; and wherein the stop in the bore of the equipment sub comprises a shoulder formed as a part of a wedge shaped annular recess in a wall of the equipment sub, the shoulder being engaged by the arcuate segments when the circular body is in the engaged position and wherein the annular recess leads to a seal region of the equipment sub, the seal region comprising a sloping surface relative to a line drawn parallel to a central axis of the cylindrical aperture, the seal region being engaged by the peripheral seal of the circular body when the body is in the engaged position within the aperture.

5. The combination equipment sub and improved closure of claim 4, wherein the common actuating means comprises a plurality of cross bars extending generally radially of the circular body, each cross bar being coupled at an outer extent thereof to a respective one of the segments and being coupled at an opposite inner extent thereof to a central hub assembly which can be rotated to cause radial movement of the cross bars to move the segments outwardly or inwardly.

6. In combination, an equipment sub having a generally cylindrical aperture leading to a bore and a bore stop and an improved closure therefor, the combination comprising:

a circular body for engaging and disengaging the cylindrical aperture of the equipment sub, the circular body carrying a peripheral seal for sealing within the aperture when in an engaged position;

a plurality of arcuate segments mounted on the cylindrical body;

a common actuating means connecting the plurality of arcuate segments for simultaneously moving the arcuate segments radially outward to engage the stop in the bore of the sub and thereby prevent axial movement in at least one direction between the circular body and the bore of the sub;

wherein the stop in the bore of the equipment sub comprises a shoulder formed as a part of a wedge shaped annular recess in a wall of the equipment sub, the shoulder being engaged by the arcuate segments when the circular body is in the engaged position and wherein the annular recess leads to a seal region of the equipment sub, the seal region comprising a sloping surface relative to a line drawn parallel to a central axis of the cylindrical aperture, the seal region being engaged by the peripheral seal of the circular body when the body is in the engaged position within the aperture;

wherein the common actuating means comprises a plurality of cross bars extending generally radially of the circular body, each cross bar being coupled at an outer extent thereof to a respective one of the segments and being coupled at an opposite inner extent thereof to a central hub assembly which can be rotated to cause radial movement of the cross bars to move the segments outwardly or inwardly; and wherein each arcuate segment has a pair of spaced guide rods attached thereto, each guide rod being received within a lateral opening provided in an associated guide block which is anchored to the circular body, and wherein the guide rods are, in turn, attached to a cross bar connector which is used to connect the guide rods to a selected cross bar.

7. The combination equipment sub and closure of claim 6, wherein each cross bar is pivotally attached to the central hub assembly, the central hub assembly having a lever arm for rotating the hub assembly, wherein movement of the hub assembly causes radial movement of the cross bars to move the segments outwardly or inwardly.

8. The combination equipment sub and closure of claim 7, wherein each of the lateral openings provided in the guide blocks have mounted therein a hard plastic bushing which provides a reduced friction slide surface for the guide rods.

9. The combination equipment sub and closure of claim 8, wherein the sloping surface which forms the seal region of the equipment sub forms an angle in the range from about 10–20° relative to a line drawn parallel to the central axis of the cylindrical aperture, the sloping surface being engaged by the peripheral seal of the cylindrical body when the body is in the engaged position within the aperture.

10. The combination equipment sub and closure of claim 9, wherein the sloping surface forms an angle of approximately 15 degrees relative to a line drawn parallel to the central axis of the cylindrical aperture.

11. The combination equipment sub and closure of claim 10, wherein the circular body has an outer peripheral flange, the outer peripheral flange having an O-ring groove which circumscribes the flange and which carried an O-ring therein, the O-ring being arranged to contact and seal with the sloping surface of the equipment sub when the cylindrical body is in the engaged position.

12. The combination equipment sub and closure of claim 11, wherein the lever arm which is used to rotate the central hub assembly carries a pressure locking device which must be deactivated before the lever can be moved to disengage the segments from the aperture in the equipment sub.

13. The combination equipment sub and closure of claim 12, wherein the pressure locking device is a bolt which is received within a vertical opening in the lever arm, the bolt being threadedly received within an opening provided within the cylindrical body which opening communicates with an interior of the equipment sub, removal of the bolt from the threaded bore serving to communicate pressure within the interior of the equipment sub to an exterior thereof.

14. In combination, an equipment sub having a generally cylindrical aperture leading to a bore and a bore stop and an improved closure therefor, the combination comprising:

a circular body for engaging and disengaging the cylindrical aperture, the circular body carrying a peripheral seal for sealing within the aperture when in an engaged position;

a plurality of arcuate segments mounted on the cylindrical body;

a common actuating means connecting the plurality of arcuate segments for simultaneously moving the arcuate segments radially outward to engage the stop in the bore of the sub and thereby prevent axial movement in at least one direction between the circular body and the bore of the sub;

wherein the stop in the bore of the equipment sub comprises a shoulder formed as a part of a wedge shaped annular recess in a wall of the equipment sub, the shoulder being engaged by the arcuate segments when the circular body is in the engaged position and wherein the annular recess leads to a seal region of the equipment sub, the seal region comprising a sloping surface relative to a central axis of the cylindrical aperture, the seal region being engaged by the peripheral seal of the circular body when the body is in the engaged position within the aperture;

wherein a hinge assembly is used to mount the closure upon the equipment sub, the hinge assembly having upper and lower mounting blocks which are affixed to the sub, upper and lower flanges and an intermediate body, the flanges supporting cross members which are attached by means of upper and lower plates, respectively, to the circular body of the closure; and wherein the upper and lower mounting blocks are joined to the upper and lower flanges, respectively, by a bearing assembly, each bearing assembly including an independent door alignment adjustment mechanism.

15. The combination of claim 14, wherein each independent door alignment mechanism includes a pair of oppositely arranged adjustment bolts, each bolt being located within a threaded bore which allows an inner extent of each bolt to contact a vertical shaft making up a part of the bearing assembly.

16. The combination of claim 15, wherein the vertical shaft is adjustable by loosening one bolt of a respective bolt pair and tightening an opposite bolt of the bolt pair.

* * * * *